(12) United States Patent
Baum et al.

(10) Patent No.: US 7,488,179 B2
(45) Date of Patent: Feb. 10, 2009

(54) COMPONENT HOLDER

(75) Inventors: Michael Baum, Tiefenbronn-Lehningen (DE); Thomas Wörner, Stuttgart (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 11/949,404

(22) Filed: Dec. 3, 2007

(65) Prior Publication Data

US 2008/0157551 A1 Jul. 3, 2008

(30) Foreign Application Priority Data

Dec. 1, 2006 (DE) .................. 10 2006 057 164

(51) Int. Cl.
*H01R 33/00* (2006.01)

(52) U.S. Cl. ........................ 439/34; 73/146.5

(58) Field of Classification Search .............. 439/34, 439/527, 574; 73/146.5, 146.8
See application file for complete search history.

(56) References Cited

U.S. PATENT DOCUMENTS

| 6,319,014 | B1 * | 11/2001 | Gunay et al. ................ 439/34 |
| 6,386,903 | B1 * | 5/2002 | Grossman .................. 439/483 |
| 6,441,727 | B1 | 8/2002 | LeMense |
| 6,647,773 | B2 | 11/2003 | Nantz et al. |
| 6,722,925 | B2 | 4/2004 | Skofljanec |
| 7,000,949 | B2 * | 2/2006 | Bostic et al. ................ 280/779 |
| 7,246,518 | B2 | 7/2007 | Ito et al. |
| 7,278,306 | B2 | 10/2007 | Baum |

FOREIGN PATENT DOCUMENTS

| DE | 19622308 C1 | 7/1997 |
| DE | 20019524 U1 | 3/2001 |
| DE | 10206725 A1 | 11/2002 |
| DE | 10307291 A1 | 9/2003 |
| DE | 102004037956 A1 | 2/2006 |
| EP | 1683657 A1 | 7/2006 |

OTHER PUBLICATIONS

European Search Report, dated Feb. 7, 2008.
German Patent- and Trademark Office Search Report, dated Jul. 24, 2007.

* cited by examiner

*Primary Examiner*—Phuong K Dinh

(57) ABSTRACT

A holder for a component on a vehicle has two holding elements fastened independently and at a distance from each other to the vehicle. A first holding element has a first latching element which interacts perpendicular to the plane of the holding region with a first mating latching element which is complementary thereto and is formed on a first end side of the component. A second holding element has a second latching element which interacts parallel to the holding region plane with a second mating latching element which is complementary thereto and is formed on a second end side of the component. The second holding element has a receiving opening which is passed through by a protruding region, which is formed on the second end side, wherein an opening edge of the receiving opening engages around the protruding component region at least on a side remote from the holding region.

8 Claims, 2 Drawing Sheets

COMPONENT HOLDER

CROSS-REFERENCE TO RELATED APPLICATION

This application claims the priority, under 35 U.S.C. § 119, of German application DE 10 2006 057 164.9, filed Dec. 1, 2006; the prior application is herewith incorporated by reference in its entirety.

BACKGROUND OF THE INVENTION

Field of the Invention

The present invention relates to a holder for a component on a motor vehicle.

A multiplicity of components are to be held on motor vehicles, i.e. to be fastened to them. These may be electric and/or electronic components, such as, for example, control devices and sensors. Also known in particular are tire pressure control systems which have a pressure sensor in the particular vehicle tire, the pressure sensor communicating wirelessly with a transponder unit which is to be fitted to the vehicle in the vicinity of the particular pressure sensor. The transponder unit, for its part, is connected to a corresponding control device of the tire pressure control system in order to evaluate the signals of the pressure sensors. The transponder unit contains, for example, an antenna and a transmitting and receiving unit in order to retrieve the measured data from the particular sensor. A transponder unit of this type may likewise form a component in the above-mentioned sensor, which is fastened to the vehicle by a holder mentioned at the beginning. For repair and maintenance purposes, it may be advantageous to fasten components of this type, in particular a transponder unit of this type, to the vehicle in such a manner that they can be fitted and can be removed in a simple manner.

SUMMARY OF THE INVENTION

It is accordingly an object of the invention to provide a component holder that overcomes the above-mentioned disadvantages of the prior art devices of this general type, which is distinguished in particular by providing a simplified mounting and removal of the particular component.

With the foregoing and other objects in view there is provided, in accordance with the invention, a holder for a component on a motor vehicle. The holder contains two holding elements including a first holding element and a second holding element. The holding elements can be fastened independently of each other and at a distance from each other to the motor vehicle. The first holding element has at least one first latching element acting perpendicularly to a generally planar holding region of the motor vehicle and interacts perpendicular to a plane of the holding region with at least one first mating latching element being complementary thereto and formed on a first end side of the component. The second holding element has at least one second latching element acting parallel to the plane of the holding region and interacts parallel to the plane of the holding region with at least one second mating latching element which is complementary thereto and formed on a second end side of the component. The second end side is remote from the first end side of the component. The second holding element has a receiving opening which is passed through parallel to the plane of the holding region by a protruding region, which is complementary thereto and formed on the second end side, of the component. The receiving opening is defined by an opening edge engaging around the protruding region at least on a side remote from the holding region.

The invention is based on the general concept of fastening the particular component to the vehicle with the aid of two separate holding elements. The one holding element, a first holding element below, has first latching elements which interact perpendicular to a planar holding region of the vehicle with first mating latching elements, which are complementary to the first latching elements, of the component, while the other holding element, a second holding element below, has second latching elements which interact parallel to the holding region plane with second mating latching elements, which are complementary to the second latching elements, of the component. This enables the component to be latched to the vehicle in two directions perpendicular to each other, and the holder therefore operates particularly securely and ensures reliable fixing of the component to the vehicle.

Furthermore, the second holding element is equipped with a receiving opening into which a protruding region of the component can be inserted parallel to the holding region plane. This also gives rise, in the region of the second holding element, to a form-fitting securing perpendicular to the holding region plane between the component and the second holding element and therefore between the component and the vehicle.

In accordance with an added feature of the invention, the holding elements are matched to each other and to the component such that, with the holding elements mounted fixedly on the motor vehicle, the component can be mounted on them and can be removed from them.

In accordance with an additional feature of the invention, the receiving opening and the protruding region are matched to each other such that the protruding region can only be inserted into the receiving opening when the component is in its correct fitted position.

In accordance with another feature of the invention, an expanding body is provided and at least one of the holding elements has a hollow, expandable fixing body which projects, in a fitted state, into a receiving opening formed in the holding region and the expandable fixing is expanded by the expanding body placed coaxially therein.

In accordance with another added feature of the invention, the at least one latching element and the at least one first mating latching element engage, in a latched state, in a form-fitting manner over each other parallel to the plane of the holding region.

In accordance with another further feature of the invention, the component, in a fitted state, is disposed with its end sides between the two holding elements.

In accordance with a further embodiment of the invention, a covering is provided for mounting on the motor vehicle and covers the holding region together with the component and the holding elements to an outside.

In accordance with a concomitant feature of the invention, the component is a transponder unit of a tire pressure control system which, first, communicates wirelessly with a pressure sensor disposed in a particular tire and, second, is connected to a corresponding control device.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a component holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
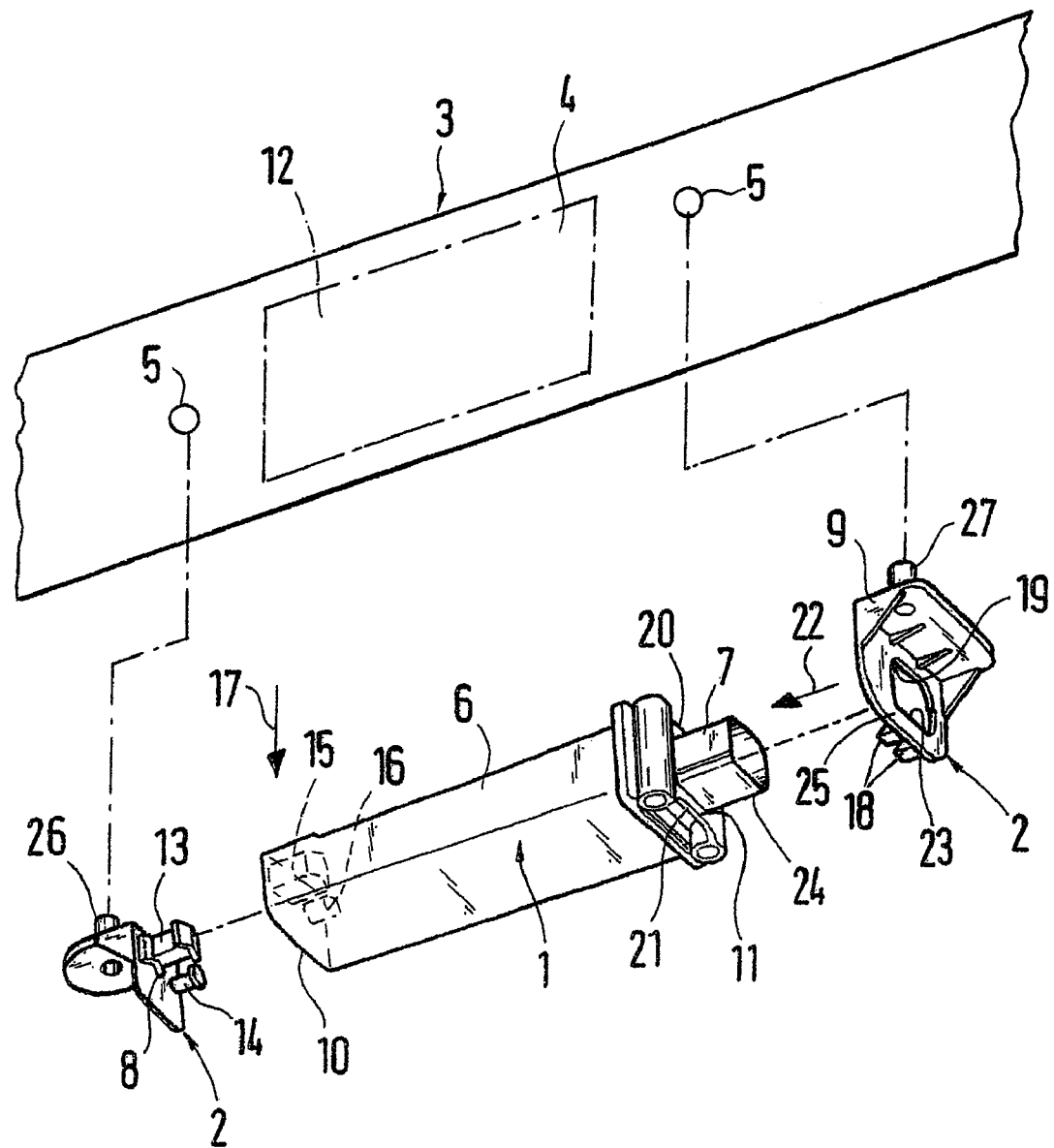
FIG. 1 is a diagrammatic, exploded perspective view of a holder with a component according to the invention.

Referring now to the figures of the drawing in detail and first, particularly, to FIG. 1 thereof, there is shown a component 1 that is to be fastened to a motor vehicle 3 (only partially illustrated) with the aid of a holder 2. For this purpose, a substantially planar holding region 4 is provided on the motor vehicle 3 and can already be provided with mounting openings 5 with which the holder 2 interacts in order to fix the component 1 on the vehicle 3. The component 1 can basically be any desired component 1. However, it is preferably an electric and/or electronic component 1. The component 1 can be in particular a transponder unit of a tire pressure control system. The transponder unit is configured such that it, first, can communicate wirelessly with at least one pressure sensor which is disposed in the particular tire. Second, the transponder unit is connected to a corresponding control device of the tire pressure control system and can transmit the measurement signals of the pressure sensor to the control system. For this purpose, the transponder unit contains a sending and/or receiving unit and an antenna, with the individual electric and/or electronic components being accommodated in a corresponding housing 6 of the component 1. The electric component 1 is connected to an electric power system of the vehicle 3 via an electric connection 7. In particular, the transponder unit is connected to a control device of a tire pressure control system via the electric connection 7.

The holder 2 has two holding elements, namely a first holding element 8 and a second holding element 9. The first holding element 8 is assigned to a first end side 10 of the component 1 while the second holding element 9 is assigned to a second end side 11 of the component 1, which end side is remote from the first end side 10.

As explained, the holding region 4 is of a generally planar configuration, i.e. it extends generally in a plane 12 which is indicated here by dash-dotted lines which symbolize a rectangle situated in the holding region plane 12.

The first holding element 8 has first latching elements 13, 14 which are configured in such a manner that they act perpendicularly to the holding region plane 12. The component 1 has, in particular on its housing 6, first mating latching elements 15, 16, which are only reproduced in a schematized manner here. The first mating latching elements 15, 16 are configured in a complementary manner to the first latching elements 13, 14 and are formed on the first end side 10. In FIG. 1, they are located on a lower side, which faces away from the observer, of the component 1 and of the housing 6. The first latching elements 13, 14 and the first mating latching elements 15, 16 are configured in such a manner that they interact with one another perpendicular to the holding region plane 12. This means that the first latching elements 13, 14 and the first mating latching elements 15, 16 are moved toward one another in a first latching direction 17, indicated by an arrow, when they are to be latched to one another. In this case, this first latching direction 17 extends perpendicular to the holding region plane 12.

In contrast thereto, the second holding element 9 has second latching elements 18, 19 which are configured in such a manner that they act parallel to the holding region plane 12. Second mating latching elements 20, 21 are formed on the second end side 11 of the component 1 in a complementary manner to the second latching elements 18, 19. The second latching elements 18, 19 and the second mating latching elements 20, 21 are matched to one another in such a manner that they interact parallel to the holding region plane 12. This means that the second latching elements 18, 19 are moved toward each other relative to the second mating latching elements 20, 21 in accordance with a second latching direction 22, which is symbolized by an arrow and runs parallel to the holding region plane 12, in order to latch the second latching elements 18, 19 to the second mating latching elements 20, 21.

Furthermore, the second holding element 9 has a receiving opening 23 which is configured in such a manner that a region 24 of the component 1, which region protrudes parallel to a longitudinal direction of the component 1, which direction is defined by the direction in which the two end sides 10, 11 are spaced, can be inserted therein. The protruding region 24 is formed here by the bushing body of the electric connection 7. In the mounted state, the protruding region 24 passes through the receiving opening 23 in such a manner that an opening edge 25 of the receiving opening 23 engages around the protruding component region 24 at least on a side remote from or facing away from the holding region 12. In the example shown, the receiving opening 23 is surrounded on all sides by the opening edge 25, and therefore the opening edge 25, in the mounted state, also encloses the protruding component region 24 in a closed manner.

Figure 2:
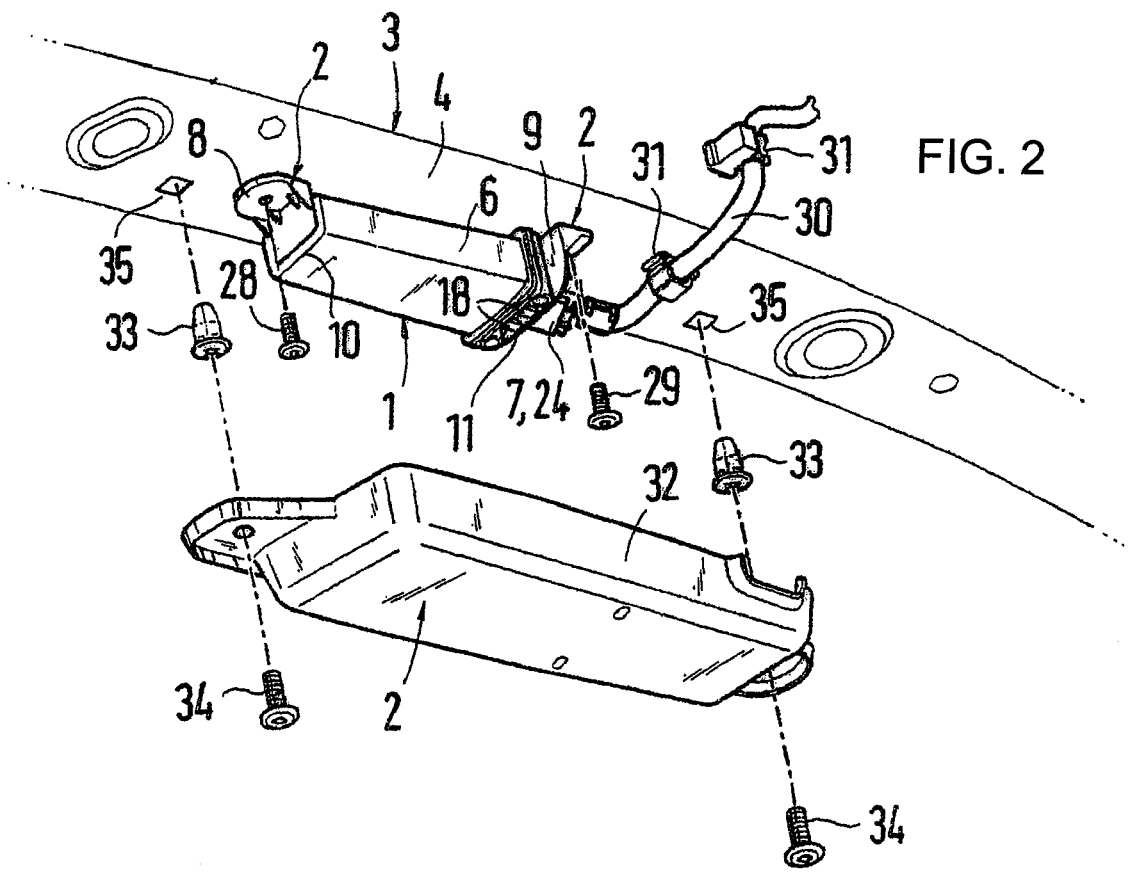
FIG. 2 is a diagrammatic, exploded perspective view of the holder with a covering.

In order to mount the component 1 on the vehicle 3, it is basically possible first of all to fit the individual, separate holding elements 8, 9 in each case to the respective end side 10, 11 of the component 1. For this purpose, the holding elements 8, 9 can be latched in a simple manner by their latching elements 13, 14, 18, 19 and in accordance with their latching directions 17, 22 to the complementary mating latching elements 17, 18, 20, 21. Subsequently, the subassembly thus formed, containing component 1 and the holding elements 8, 9 which are fitted thereto and therefore latched thereto, can be fastened to the vehicle 3 in the holding region 4. For the fastening to the vehicle 3, each holding element 8, 9 can be provided, for example, with a hollow, expandable fixing body 26 or 27 which protrudes from the respective holding element 8, 9 perpendicularly to the holding region plane 12 and can be inserted into the openings 5 provided in the holding region 4. A corresponding expanding body 28, 29, which is illustrated in FIG. 2, for example a screw, is placed coaxially into the respective fixing body 26, 27 on a side facing away from the holding region 4, as a result of which the fixing body 26, 27 expands and thereby fixes the respective holding elements 8, 9 to the vehicle 3.

In a preferred embodiment, the holding elements 8, 9 are matched to each other and to the component 1 in such a manner that it is possible also to mount the component 1 on the vehicle 3 and to remove it therefrom when the holding elements 8, 9 are mounted on the vehicle 3. The mounting operation may then proceed, for example, in such a manner that the component 1 is first of all introduced by its protruding component region 24 into the receiving opening 23 in accordance with the second latching direction 22. In this case, the second latching elements 18, 19 may be at least partially latched already to the second mating latching elements 20, 21. The component 1 can subsequently be pivoted about an axis which runs parallel to the holding region plane 12 and perpendicular to the second latching direction 22 in the direction of the vehicle 3, as a result of which the first latching direction 17 is realized between the first holding element 8 and the first end side 10. The first holding elements 13, 14, can accordingly be latched to the first mating latching elements 15, 16. The last, second latching elements 18, 19 can also be latched at the latest now to the associated second mating latching elements 20, 21. The removal of the component 1 may then take place in a correspondingly reversed sequence.

According to the preferred embodiment shown here, the receiving opening 23 and the protruding component region 24 can be matched to each other in respect of their cross sections in such a manner that the protruding component region 24 can then only be inserted into the receiving opening 23 parallel to the holding region plane 12 when the component 1 is correctly positioned, i.e. when its lower side actually faces the holding region 4. This enables inadvertent erroneous mounting of the component 1 to be avoided.

The first latching elements 13, 14 and the associated first mating latching elements 15, 16 may be configured in such a manner that they engage behind each other in a form-fitting manner parallel to the holding region plane 12, i.e. perpendicular to the first latching direction 17, in the latched state. This results in an additional fixing and holding action between the first holding element 8 and the component 1. For this form-fitting action, the first latching elements 13, 14 can have mushroom-shaped or roof-shaped expanded portions at their free ends while the first mating latching elements 15, 16 have undercut contours complementary thereto.

In contrast thereto, the second latching elements 18, 19 are formed, for example, by latching hooks which are resilient transversely with respect to the second latching direction 22, with it being possible for the second mating latching elements 20, 21 to be formed by latching edges or latching contours which run transversely with respect to the second latching direction 22 and behind which the latching hooks can engage.

According to FIG. 2, the component 1 is disposed, in the fitted state, with its end sides 10, 11 parallel to the holding region plane 12 between the two holding elements 8, 9 and is secured by the latter against relative movements in the longitudinal direction of the component 1. FIG. 2 also shows an electric cable 30 which, in the fitted state, is connected to the electric connection 7. The cable 30 can be fixed on the vehicle 3 by corresponding clip connectors 31.

Figure 3:
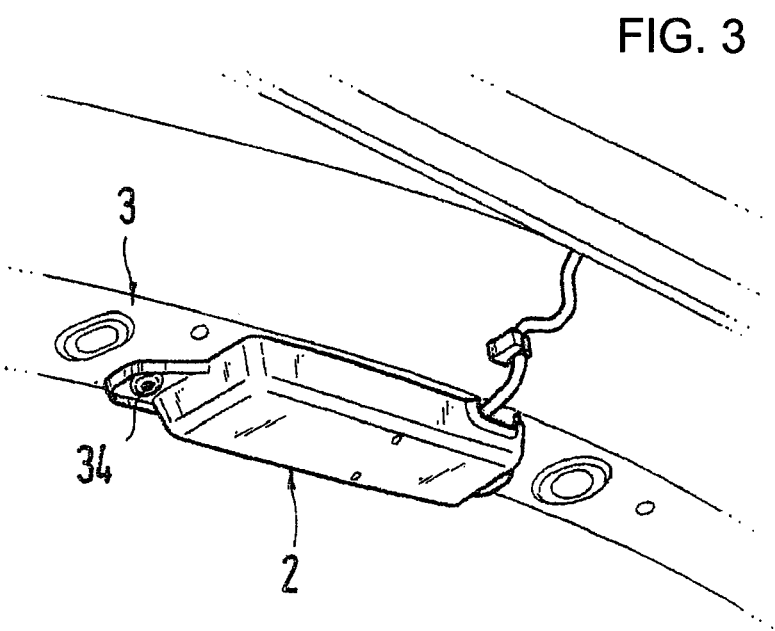
FIG. 3 is a diagrammatic, perspective view of the holder in a mounted state with the covering.

According to FIGS. 2 and 3, the holder 2 can furthermore be provided with a covering 32 which can be mounted on the vehicle 3 in such a manner that the entire holding region 4 together with the component 1 and with the holding elements 8, 9 can be covered to the outside therewith. This protects the component 1 including the holder 2 against contamination. This also provides a certain contact protection for off-road vehicles.

The covering 32 can be fastened to the vehicle 3, for example by screws 34, the screws 34 engaging in clip elements 33 which are inserted into corresponding receiving openings 35 of the vehicle 3.

The invention claimed is:

1. A holder for a component on a motor vehicle, the holder comprising:
    two holding elements including a first holding element and a second holding element, said holding elements for fastening independently of each other and at a distance from each other to the motor vehicle:
        said first holding element having at least one first latching element acting perpendicularly to a generally planar holding region of the motor vehicle and interacting perpendicular to a plane of the holding region with at least one first mating latching element being complementary thereto and formed on a first end side of the component;
        said second holding element having at least one second latching element acting parallel to the plane of the holding region and interacting parallel to the plane of the holding region with at least one second mating latching element being complementary thereto and formed on a second end side of the component, the second end side being remote from the first end side of the component;
        said second holding element having a receiving opening formed therein which is passed through parallel to the plane of the holding region by a protruding region, which is complementary thereto and formed on the second end side, of the component; and
        said receiving opening defined by an opening edge engaging around the protruding region at least on a side remote from the holding region.

2. The holder according to claim 1, wherein said holding elements are matched to each other and to the component such that, with said holding elements mounted fixedly on the motor vehicle, the component can be mounted on them and can be removed from them.

3. The holder according to claim 1, wherein said receiving opening and the protruding region are matched to each other such that the protruding region can only be inserted into said receiving opening when the component is in its correct fitted position.

4. The holder according to claim 1,
    further comprising an expanding body; and
    wherein at least one of said holding elements has a hollow, expandable fixing body which projects, in a fitted state, into a receiving opening formed in the holding region and said expandable fixing body being expanded by said expanding body placed coaxially therein.

5. The holder according to claim 1, wherein said at least one latching element and the at least one first mating latching element engage, in a latched state, in a form-fitting manner over each other parallel to the plane of the holding region.

6. The holder according to claim 1, wherein the component, in a fitted state, is disposed with its end sides between said two holding elements.

7. The holder according to claim 1, further comprising a covering for mounting on the motor vehicle and covering the holding region together with the component and said holding elements to an outside.

8. The holder according to claim 1, wherein the component is a transponder unit of a tire pressure control system which, first, communicates wirelessly with a pressure sensor disposed in a particular tire and, second, is connected to a corresponding control device.

* * * * *